Patented Nov. 6, 1951

2,573,811

UNITED STATES PATENT OFFICE 2,573,811

PROCESS FOR PRODUCING 1 AMINO 2,3 DI-CYANO 4 OXYALKYLAMINO ANTHRAQUI-NONES

Victor S. Salvin, Irvington, and John R. Adams, Jr., Summit, N. J., assignors to Celanese Corporation of America, New York, N. Y., a corporation of Delaware No Drawing. Application July 1, 1950, Serial No. 171,756

11 Claims. (Cl. 260—379)

This invention relates to anthraquinone dyestuffs and relates more particularly to an improved process for the production of certain novel anthraquinone dyestuffs of the general formula:

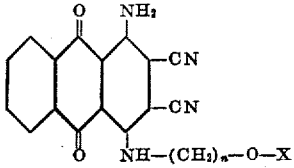

wherein $n$ is an integer from 1 to 5 and X is an alkyl or hydroxyalkyl group. Examples of alkyl groups which may be present in said dyestuff are the methyl, ethyl, propyl and isopropyl groups, while examples of hydroxyalkyl groups are hydroxymethyl, hydroxyethyl, hydroxypropyl and hydroxyisopropyl groups. These novel dyestuffs dye cellulose acetate and other organic derivative of cellulose materials in valuable blue shades exhibiting a satisfactory resistance to acid fading.

The present application is a continuation-in-part of our copending applications Ser. No. 115,768, filed September 14, 1949, and Ser. No. 136,650, filed January 3, 1950.

The anthraquinone dyestuffs, described above and which form the basis of said copending applications, have heretofore been obtained by reacting the compound 1-amino-2-sulfo-4-bromo-anthraquinone with an hydroxyalkoxyalkyl amine or alkoxyalkylamine of the formula

NH₂-(CH₂)ₙ-O-X so that the 4-brom substituent is replaced by the amine, purifying the amino-anthraquinone intermediate by washing or the like, and then reacting the said intermediate with an alkali metal cyanide whereby a cyano group replaces the 2-sulfo group and a second cyano group enters in the 3-position. The dyestuff precipitates from the reaction mixture and, after being filtered out, is subjected to a purification treatment before it is ready for use. As carried out heretofore, this process produced a relatively low yield of the desired dyestuff and was, therefore, not wholly suited for commercial use.

It is an important object of this invention to provide a process for preparing the aforementioned anthraquinone dyestuffs which will be free from the foregoing and other disadvantages of the processes previously used for this purpose.

A further object of this invention is to provide a process for preparing the aforementioned anthraquinone dyestuffs whereby the dyestuffs are obtained in a high yield and in a high degree of purity.

Other objects of this invention will appear from the following detailed description and claims.

According to the present invention, anthraquinone dyestuffs of the formula

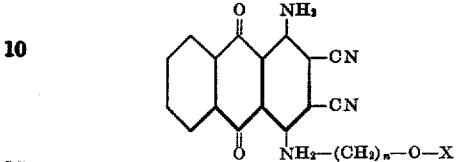

wherein $n$ is an integer from 1 to 5 and X is an alkyl or hydroxyalkyl group are obtained in significantly improved yields by carrying out the initial amination of the compound 1-amino-2-sulfo-4-bromoanthraquinone, wherein the 4-brom group is replaced, in a medium containing an acid binding agent, removing the excess amine from the reaction mixture, and effecting the cyanation of the intermediate so formed in a medium maintained at a pH of about 9.6 to 10.1.

Thus, in carrying out the process of the instant invention, 1-amino-2-sulfo-4-bromoanthraquinone is reacted with a hydroxyalkoxyamine or alkoxyalkylamine in an aqueous medium containing about 0.5 to 3 mols of an acid binding agent for each mol of the anthraquinone undergoing reaction, employing a reaction temperature of about 75 to 90° C. and a reaction period of about 2 to 8 hours. Suitable acid binding agents include alkali metal carbonates such as sodium carbonate, potassium carbonate, sodium bicarbonate, or the like. Preferably for each mol of the 1 - amino - 2 - sulfo - 4 - bromoanthraquinone, there is employed about 2 to 6 mols of the hydroxyalkoxyalkylamine or alkoxyalkylamine. The presence of the acid binding agent shortens the reaction period and reduces the amount of amine required, and also improves the yield and purity of the amino-anthraquinone intermediate.

To catalyze the amination reaction, there may be employed cupric acetate, cupric chloride, or activated copper powder. The catalyst is usually employed in an amount of from about 0.025 to 0.1 mol for each mol of the anthraquinone undergoing reaction. After the amination is complete, the reaction mixture is filtered to remove any solids and the filtrate is vacuum distilled to remove the excess amine. The residue of the vacuum distillation may then be employed directly from the cyanation reaction since it contains only negligible quantities of impurities, or, if desired, the residue may be dissolved and the solution acidified with hydrochloric acid so as to precipitate the amino-anthraquinone intermediate therefrom as the hydrochloride. The precipitate is filtered and then washed with dilute hydrochloric acid further to purify the same.

The cyanation is carried out by dissolving the amino-anthraquinone intermediate in water and adding to the solution an alkali metal cyanide and a sufficient amount of a buffer salt to bring the pH to about 9.6 to 10.1. The reaction mixture is then heated to a temperature of about 70 to 90° C. for about 8 to 24 hours, with periodic additions of the buffer, if necessary, to maintain the pH at about 9.6 to 10.1. The 2-sulfo group is replaced by a cyano group during the above reaction and a second cyano group is also introduced in the 3-position. As the dyestuff is formed, it precipitates from the solution and may be recovered by filtration. By maintaining the cyanation reaction mixture at pH of about 9.6 to 10.1, the speed of the reaction and the yield and purity of the dyestuff are improved.

Examples of suitable buffer salts are alkali metal dihydrogen phosphates such as sodium or potassium dihydrogen phosphate, the sodium or potassium salts of citric or boric acid, or the like. Periodic additions of the foregoing salts to the reaction mixture are necessary to maintain the pH between the desired limits. Advantageously, however, there is employed as a buffer salt an alkali metal bicarbonate such as sodium bicarbonate, potassium bicarbonate, or the like, since a single addition of the bicarbonate serves effectively to maintain the pH between the desired limits during the entire reaction.

The following examples are given to ilustrate this invention further.

Example I

A mixture of 45 parts by weight of 1-amino-2-sulfo-4-bromoanthraquinone, 10 parts by weight of sodium carbonate, 1 part by weight of cupric acetate and 45 parts by weight of β-methoxyethylamine is dissolved in 330 parts by weight of water and heated with stirring at 80° C. for 3 hours. The solution is filtered and heated under vacuum to remove water and excess amine which may be used again for the amination reaction. The residue from the vacuum distillation is dissolved in 500 parts by weight of water and the solution brought to pH 7 with about 11 parts by weight of 36.5% hydrochloric acid. An additional 71 parts by weight of 36.5% hydrochloric acid is added to the solution, precipitating the hydrochloride of 1-amino-2-sulfo-2-β-methoxyethylaminoanthraquinone, which is filtered with suction and washed twice with 3% hydrochloric acid. There is obtained 40 parts by weight of the intermediate or 82% of theoretical.

There is added to 800 parts by weight of water, 36 parts by weight of the hydrochloride of 1-amino-2-sulfo-4-β-methoxyethylaminoanthraquinone together with 8 parts by weight of sodium bicarbonate to bring the pH of the solution to 7 to 9 and cause the hydrochloride to dissolve. To the solution there are added 25 parts by weight of sodium cyanide and 16 parts by weight of potassium dihydrogen phosphate. The pH of the solution is 9.7. The solution is heated to 80° C. for 11 hours with periodic additions of potassium dihydrogen phosphate to maintain a pH of about 9.6 to 10.1. At the completion of the reaction, the mixture is cooled and the precipitated dyestuff filtered off. There is obtained 23 parts by weight of the dyestuff

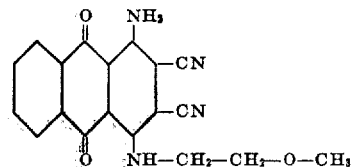

or 76% of theoretical based on the intermediate.

Example II

There is added to 800 parts by weight of water, 36 parts by weight of the residue from the vacuum distillation of the 1-amino-2-sulfo-4-β-methoxy-ethylaminoanthraquinone as prepared in Example I, together with 25 parts by weight of sodium cyanide and 12 parts by weight of sodium bicarbonate. The pH of the solutions is 9.65. The solution is heated, with stirring, to 80° C. for 11 hours, during which time the pH rises to 10.1. At the completion of the reaction, the mixture is cooled and the precipitated dyestuff filtered off. There is obtained 27 parts by weight of the dyestuff

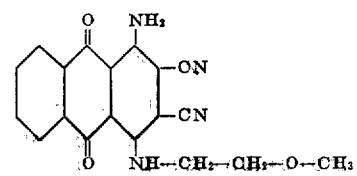

or 81% of theoretical based on the intermediate.

It is to be understood that the foregoing detailed description is given merely by way of illustration and that many variations may be made therein without departing from the spirit of our invention.

Having described our invention, what we desire to secure by Letters Patent is:

1. In a process for the production of anthraquinone dyestuffs, the step which comprises subjecting an intermediate of the formula

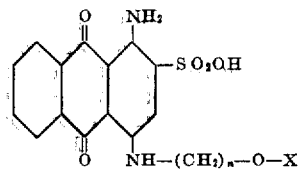

wherein $n$ is an integer from 1 to 5 and X is a member of the group consisting of alkyl and hydroxyalkyl groups to a cyanation reaction with an alkali metal cyanide in a medium having a pH of about 9.6 to 10.1.

2. In a process for the production of anthraquinone dyestuffs, the step which comprises subjecting an intermediate of the formula

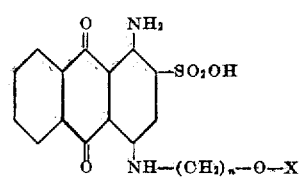

wherein $n$ is an integer from 1 to 5 and X is a member of the group consisting of alkyl and hydroxyalkyl groups to a cyanation reaction with an alkali metal cyanide in a medium containing a buffer salt to bring the pH to about 9.6 to 10.1.

3. In a process for the production of anthraquinone dyestuffs, the step which comprises subjecting an intermediate of the formula

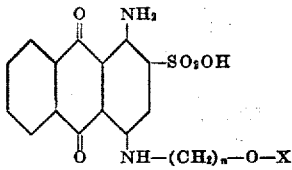

wherein $n$ is an integer from 1 to 5 and $X$ is a member of the group consisting of alkyl and hydroxyalkyl groups to a cyanation reaction with an alkali metal cyanide in a medium containing a buffer salt to bring the pH to about 9.6 to 10.1, and adding further quantities of buffer salt to the medium during the reaction to maintain the pH at about 9.6 to 10.1.

4. In a process for the production of anthraquinone dyestuffs, the step which comprises subjecting an intermediate of the formula

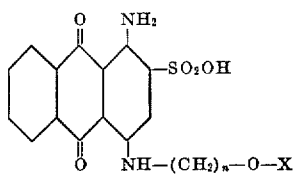

wherein $n$ is an integer from 1 to 5 and $X$ is a member of the group consisting of alkyl and hydroxyalkyl groups to a cyanation reaction with an alkali metal cyanide in a medium containing an alkali metal bicarbonate to bring the pH to about 9.6 to 10.1.

5. In a process for the production of anthraquinone dyestuffs, the step which comprises subjecting an intermediate of the formula

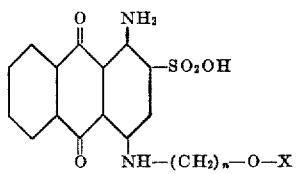

wherein $n$ is an integer from 1 to 5 and $X$ is a member of the group consisting of alkyl and hydroxyalkyl groups to a cyanation reaction with an alkali metal cyanide in a medium containing sodium bicarbonate to bring the pH to about 9.6 to 10.1, said reaction being carried out at a temperature of 70 to 90° C. for a period of 8 to 24 hours.

6. In a process for the production of anthraquinone dyestuffs, the step which comprises subjecting an intermediate of the formula

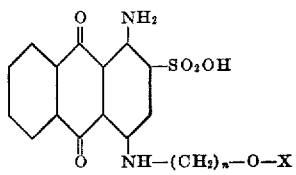

wherein $n$ is an integer from 1 to 5 and $X$ is a member of the group consisting of alkyl and hydroxyalky groups to a cyanation reaction with an alkali metal cyanide in a medium containing an alkali metal dihydrogen phosphate to bring the pH to about 9.6 to 10.1, and adding further quantities of alkali metal dihydrogen phosphate to the medium during the reaction to maintain the pH at about 9.6 to 10.1.

7. In a process for the production of anthraquinone dyestuffs, the step which comprises subjecting an intermediate of the formula

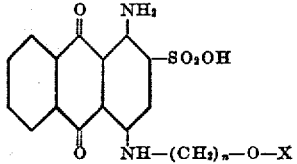

wherein $n$ is an integer from 1 to 5 and $X$ is a member of the group consisting of alkyl and hydroxyalkyl groups to a cyanation reaction with an alkali metal cyanide in a medium containing potassium dihydrogen phosphate to bring the pH to about 9.6 to 10.1, and adding further quantities of potassium dihydrogen phosphate to the medium during the reaction to maintain the pH at about 9.6 to 10.1, said reaction being carried out at a temperature of 70 to 90° C. for a period of 8 to 24 hours.

8. In a process for the production of anthraquinone dyestuffs, the steps which comprise reacting 1-amino -2- sulfo -4- bromoanthraquinone with an amine of the formula $$NH_2—(CH_2)_n—O—X$$

wherein $n$ is an integer from 1 to 5 and $X$ is a member of the group consisting of alkyl and hydroxyalkyl groups in the presence of an acid binding agent to form an intermediate, distilling any excess amine from the reaction mixture, and subjecting the residue of the distillation to a cyanation reaction with an alkali metal cyanide in a medium having a pH of about 9.6 to 10.1.

9. In a process for the production of anthraquinone dyestuffs, the steps which comprise reacting 1-amino- 2 -sulfo- 4 -bromoanthraquinone with an amine of the formula $$NH_2—(CH_2)_n—O—X$$

wherein $n$ is an integer from 1 to 5 and $X$ is a member of the group consisting of alkyl and hydroxyalkyl groups in the presence of sodium carbonate, said reaction being carried out at a temperature of 75 to 90° C. for a period of 2 to 8 hours to form a reaction mixture containing an intermediate, and subjecting the reaction mixture containing said intermediate to a cyanation reaction with an alkali metal cyanide in a medium containing sodium bicarbonate to bring the pH to about 9.6 to 10.1, said reaction being carried out at a temperature of 70 to 90° C. for a period of 8 to 24 hours.

10. In a process for the production of anthraquinone dyestuffs, the steps which comprise reacting 1-amino-2-sulfo-4-bromoanthraquinone with an amine of the formula $$NH_2—(CH_2)_n—O—X$$

wherein $n$ is an integer from 1 to 5 and $X$ is a member of the group consisting of alkyl and hydroxyalkyl groups in the presence of sodium carbonate, said reaction being carried out at a temperature of 75 to 90° C. for a period of 2 to 8 hours to form a reaction mixture containing an intermediate, and subjecting the reaction mixture containing said intermediate to a cyanation reaction with an alkali metal cyanide in a medium containing potassium dihydrogen phosphate to bring the pH to about 9.6 to 10.1, and adding further quantities of potassium dihydrogen phosphate to the medium during the reaction to maintain the pH at about 9.6 to 10.1, said reaction being carried out at a temperature of 70 to 90° C. for a period of 8 to 24 hours.

11. In a process for the production of anthraquinone dyestuffs, the steps which comprise reacting 1-amino-2-sulfo-4-bromoanthraquinone with β-methoxyethylamine in an aqueous medium containing sodium carbonate, said reaction being carried out at a temperature of 80° C. for a period of three hours to produce an intermediate, distilling water and any excess amine from the reaction mixture, and subjecting the residue of the distillation to a cyanation reaction with sodium cyanide in an aqueous medium containing sodium bicarbonate to bring the pH to about 9.6 to 10.1.

VICTOR S. SALVIN.
JOHN R. ADAMS, Jr.

REFERENCES CITED

The following references are of record in the file of this patent:

UNITED STATES PATENTS

| Number | Name | Date |
|---|---|---|
| 1,938,029 | Kugel | Dec. 5, 1933 |
| 2,357,176 | Dickey | Aug. 29, 1944 |
| 2,496,414 | Seymour | Feb. 7, 1950 |

FOREIGN PATENTS

| Number | Country | Date |
|---|---|---|
| 306,963 | Great Britain | May 27, 1930 |
| 309,454 | Great Britain | July 10, 1930 |
| 512,483 | Great Britain | Sept. 18, 1939 |

Certificate of Correction

Patent No. 2,573,811 November 6, 1951

VICTOR S. SALVIN ET AL.

It is hereby certified that error appears in the printed specification of the above numbered patent requiring correction as follows:

Column 3, line 58, for "-2-sulfo-2-β-" read -*2-sulfo-4-β-*;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*